UNITED STATES PATENT OFFICE.

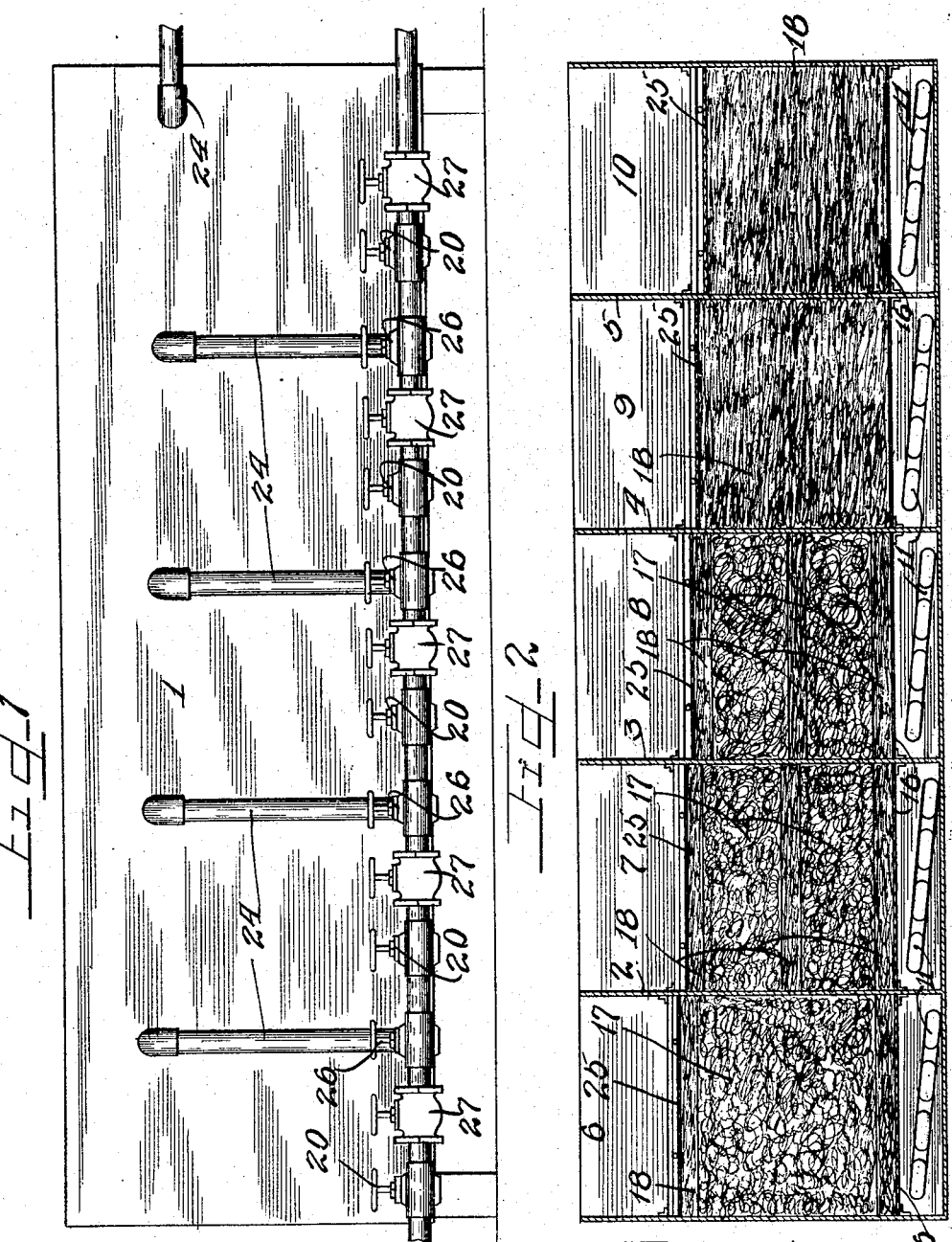

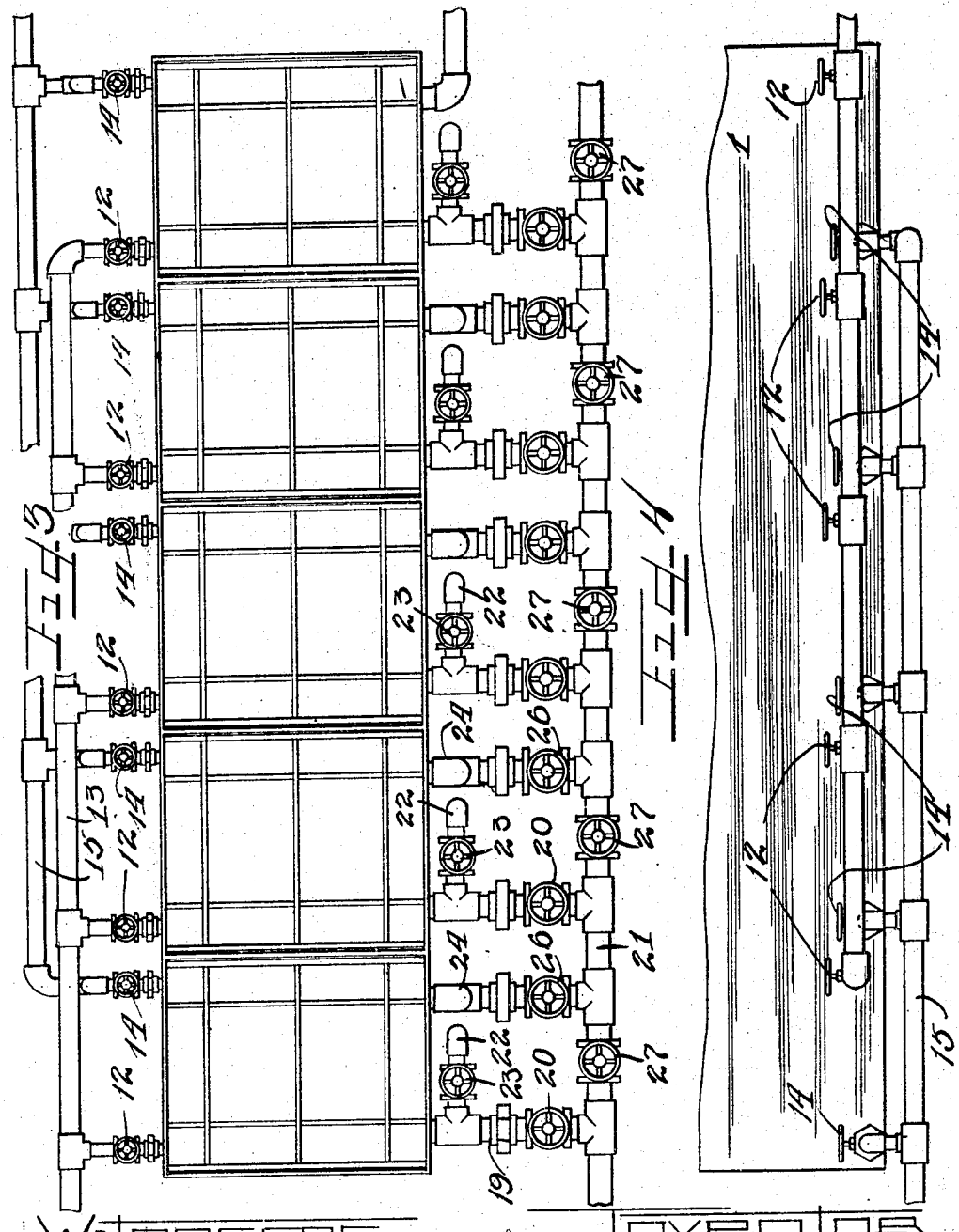

HENRY A. HILLS, OF GRAND RAPIDS, MICHIGAN.

UNITARY MULTISTAGE FILTER APPARATUS.

1,328,046.  Specification of Letters Patent.  Patented Jan. 13, 1920.

Application filed May 7, 1917. Serial No. 167,015.

*To all whom it may concern:*

Be it known that I, HENRY A. HILLS, a citizen of the United States, and a resident of the city of Grand Rapids, in the county of Kent and State of Michigan, have invented certain new and useful Improvements in Unitary Multistage Filter Apparatus; and I do hereby declare that the following is a full, clear, and exact description of the same, reference being had to the accompanying drawings, and to the numerals of reference marked thereon, which form a part of this specification.

This invention relates to a filtering apparatus wherein fluid to be filtered is caused to pass through several stages during the filtering process, and through a different composition of filtering material in each stage, and is an improvement in the apparatus shown and described in my application filed May 7th, 1917, Serial No. 167,014. This device is particularly adapted for use in power plants for the filtering of engine oil, but may also be used to advantage in cleaning establishments for the recovery of the cleaning fluid by separation of the dirty matter associated therewith where a distillation process is not used. The entire apparatus, owing to its compact construction, requires but small space for installation.

It is an object therefore of this invention to construct a filter apparatus embracing a plurality of filter stages through which the fluid to be filtered is caused to pass in successive order, and in each instance, filtering therethrough by an upward flow, thus utilizing the effect of gravity to a large extent in separating the impurities from the fluid being filtered.

It is also an object of this invention to construct a unitary multi-stage filtering apparatus wherein each of the several stages is independently heated, and with the stages so connected that an upward flow of the fluid filtered is caused to take place through each thereof in successive order, and with means for by-passing any of said filter stages for the purpose of cleaning or repairing the same without interruption of the filtering process in the other stages of the apparatus.

It is furthermore an object of this invention to construct a filter apparatus comprising a plurality of filter stages all assembled within a compact unitary casing member, and interconnected so that a flow of the fluid being filtered takes place successively through the several stages, yet permitting any one thereof to be by-passed for cleaning purposes.

It is finally an object of this invention to construct a unitary multi-stage filtering apparatus with means for heating each one of the stages of said apparatus independently, and with piping connections to constrain an upward flow of the fluid filtered through each of the respective stages of the apparatus.

The invention (in a preferred form) is illustrated in the drawings and hereinafter more fully described.

In the drawings:

Figure 1, is a front side elevation of an apparatus embodying the principles of my invention.

Fig. 2, is a longitudinal central vertical section taken therethrough.

Fig. 3, is a top plan view of the apparatus.

Fig. 4, is a fragmentary rear elevation thereof.

As shown in the drawings:

The reference numeral 1, indicates a long substantially rectangular casing having partitions 2, 3, 4 and 5, therein, dividing the same into a plurality of compartments or chambers 6, 7, 8, 9 and 10, respectively. Mounted in inclined position in the lower end of each of the respective compartments or chambers, is a steam coil, each of which is denoted by the reference numeral 11, the inlet to which is controlled in each case by a valve 12, communicating into a main steam line 13, on the exterior of the filter casing 1, at the rear thereof. The outlets of each of said steam coils 11, is controlled by a drain valve 14, and each of said drain valves 14, communicates into an exhaust drain line 15. Mounted in the lower end of each of the respective chambers 6, 7, 8, 9 and 10, is a perforated tray or screen 16, upon which, in each instance, is supported a quantity of filtering material composed of two substances, the one of waste or other similar material denoted by the reference numeral 17, and the other a fabric or felt composition, denoted by the reference numeral 18. The material 18, is more impenetrable than the material 17, and the quantity of the more impenetrable material 18, increases from stage to stage, so that the last two chambers or compartments 9 and 10, are entirely filled with the same. The reason for this is that the first stages of the filter apparatus are designed to remove the larger and heavier impurities suspended in the fluid being filtered, and the latter stages of the apparatus serve to remove the impurities of a finer nature.

An inlet pipe 19, is provided for each of the respective compartments 7, 8, 9 and 10, of the apparatus, communicating into the lower end thereof beneath the tray or screen member 16, and each of said inlet pipes is provided with a controlling valve 20, whereby the flow thereinto from the main filter line 21, is regulated. A drain 22, provided with a valve 23, communicates into the inlet pipe 19, closely adjacent the filter casing, whereby the contents of a compartment may be drained when the inlet valve 20, is closed.

An outlet pipe 24, communicates into the upper end of each of the respective filter chambers or compartments above an upper tray or screen member 25, provided therein, and said outlet pipe is provided with a valve 26, by which communication is effected with the main filter line 21.

Connected into the main filter line 21, at a plurality of points therein intermediate the points of connection of the inlet pipes 19, and outlet pipes 24, for the respective filter compartments, are valves 27, which are normally closed, and are only opened when it is desired to by-pass a filter compartment.

The operation is as follows:

The fluid to be filtered is admitted through the main filter line 21, passing through the open valve 20, and inlet valve 19, to the first filter compartment 6, and flows upwardly through the bottom screen 16, and filtering material 15, and through the filtering material 17 and 18, leaving the upper end of said compartment through the outlet pipe 24, flowing downwardly therethrough and through the open valve 26, again into the main filter line 21, the valve 27, at this point, of course, being closed in the main filter line. The fluid, after passage through the first chamber or compartment 6, and return into the main filter line 21, again passes into the next filter compartment of the filter through the inlet pipe thereof flowing upwardly therethrough, and again leaving at the upper end thereof and returning to the main filter line 21. Thus this successive filtration operation takes place in successive order, through the respective chambers 6, 7, 8, 9 and 10, and the fluid as it finally emerges from the outlet pipe 24, of the last chamber 10, is entirely clean, and free of impurities.

The steam coils provided in the lower end of each of the filter compartments, serve to heat the fluid entering thereinto, thereby facilitating the filtration process. In the event that it is desired to cut out any one of the filtering compartments, it is only necessary to close the respective inlet valve 20, and outlet valve 26, thereof, and open the filter line valve 27, therebetween, so that said compartment is by-passed, and the valve 23, of said compartment may then be opened to drain the compartment through its drain pipe 22.

I am aware that various details of construction may be varied through a wide range without departing from the principles of this invention, and I therefore do not purpose limiting the patent granted otherwise than necessitated by the prior art.

I claim as my invention:

1. A filter apparatus of the class described comprising a unitary casing, a plurality of filter compartments therein, each provided with heating means at the bottom thereof, piping connections for passing the fluid to be filtered successively through each compartment and upwardly in each compartment so as to first heat and then filter the fluid therein, and means for interrupting communication of the fluid to be filtered with any one of said compartments and for conveying the fluid directly from the compartment preceding to the compartment succeeding such compartment.

2. In a filtering apparatus the combination of an elongated receptacle having a plurality of transverse partitions dividing the receptacle into a plurality of adjoining separate compartments, a bed of filtering material in each compartment spaced from the bottom thereof to provide a distribution chamber therebelow, a reticulated partition between said chamber and the bed of filtering material for supplying the fluid to be filtered uniformly to the under surface of the bed of filtering material and to extract and permit gravitation of impurities from the fluid to be filtered to the bottom of said chamber, a combination supply and discharge pipe extending alongside of the elongated receptacle and having a separate inlet branch therefrom to the distribution chamber of each compartment, and a separate outlet branch connected therewith from the top of each compartment above the bed of filtering material therein, and a valve in each branch, and a valve intermediate of each inlet and outlet branch whereby the fluid to be filtered may be passed successively through each compartment and upwardly therein or may be passed by any one of the compartments without interrupting circulation through the other compartments.

3. In a filtering apparatus having a plurality of compartments, the combination of a bed of filtering material in each compartment spaced from the bottom thereof to provide a distribution chamber therebetween, a reticulated partition between said chamber and the bed of filtering material, a combination supply and discharge pipe having a valved inlet branch for each compartment communicating with the distribution chamber thereof and having a valved outlet branch for each compartment communicating with the compartment above the bed of filtering material therein, a valve intermediate of each inlet and outlet branch, and a valved drainage outlet from each inlet branch.

In testimony whereof I have hereunto subscribed my name in the presence of two subscribing witnesses.

HENRY A. HILLS.

Witnesses:
 CHARLES W. HILLS, Jr.,
 EARL M. HARDINE.